US006182148B1

(12) United States Patent
Tout (10) Patent No.: US 6,182,148 B1
(45) Date of Patent: Jan. 30, 2001

(54) METHOD AND SYSTEM FOR INTERNATIONALIZING DOMAIN NAMES

(75) Inventor: Walid R. Tout, Ann Arbor, MI (US)

(73) Assignee: Walid, Inc., Ann Arbor, MI (US)

( * ) Notice: Under 35 U.S.C. 154(b), the term of this patent shall be extended for 0 days.

(21) Appl. No.: 09/358,043

(22) Filed: Jul. 21, 1999

Related U.S. Application Data (60) Provisional application No. 60/124,956, filed on Mar. 18, 1999.

(51) Int. Cl.$^7$ .................................................. G06F 15/16
(52) U.S. Cl. ........................................... 709/245; 709/200
(58) Field of Search ................................... 709/245, 200, 709/228, 249

(56) References Cited

U.S. PATENT DOCUMENTS

| | | | | |
|---|---|---|---|---|
| 5,434,974 | * | 7/1995 | Loucks et al. .................. | 707/101 |
| 5,777,989 | * | 7/1999 | McGarvey ..................... | 370/254 |
| 5,812,769 | * | 9/1998 | Graber et al. .................. | 709/228 |
| 5,902,353 | * | 6/1999 | Reber et al. ................... | 709/219 |
| 5,958,052 | * | 10/1999 | Bellovin et al. ............... | 713/201 |
| 5,974,453 | * | 10/1999 | Andersen et al. .............. | 709/220 |

FOREIGN PATENT DOCUMENTS

| | | |
|---|---|---|
| WO 99 19814 | 4/1999 | (WO) . |
| WO 99 39280 | 8/1999 | (WO) . |

OTHER PUBLICATIONS iDNS—Internationalized Domain Name System, by Center for Internet Research(http://www.apng.org/ids/, Jan. 1998.*
Asia Pacific Networking Group Chairman's Commision on Internationalization of DNS(http:www.apng.org/commission/idns/), Jan. 1998.*
iDNS—Frequently Asked Questions, by Center for Internet Research(http://www.apng.org/idns/faq.html, Jan. 1998.*
"The RealName System: a Human Friendly Naming Scheme" by N. Popp, Sep. 23, 1998; internet draft.
Mauro, M.: "Cultural issues in planet–wide Internet management and administration" Technology and Society, 1998. USTAS '98, Jun., 12–13, 1998, pp. 167–169.
"Method To Allow A Windows User To Use Extended ANSI Characters Supported By Windows When Specifying user IDS, Passwords Or Domain Names To Be Used On An OS/2 Network", IBM Technical Disclosure Bulletin, US, IBM Corp. New York, vol. 34, No. 10B, Mar. 1, 1992, p. 362.
M. Duerst, "Internationalization of Domain Names," Internet Draft, Jul. 1998.
Tan et al., "iDNS, and Experimental DNS System with Unicode Support," 14th International Unicode Conference, Mar. 1999.
Popp et al., "The RealName System: a Human Friendly Naming Scheme," Internet Draft, Sep. 23, 1998.

* cited by examiner

*Primary Examiner*—Zarni Maung
*Assistant Examiner*—Philip B. Tran
(74) *Attorney, Agent, or Firm*—Calfee, Halter & Griswold LLP (57) ABSTRACT

A method and system for internationalizing domain names is provided which allows domain names to be entered in any language without having to modify the existing Internet domain name servers. When an user enters a domain name including non-English characters into an internet program, a domain name transformer intercepts the domain name prior to reaching the resolver. The domain name is converted to a standard format which can represent all language character sets, such as UNICODE. The UNICODE string is then transformed to be in RFC1035 compliant format. Redirector information is then appended to the compliant string which identifies the delegation of authoritative root servers and/or domain name servers responsible for the domain name. The compliant domain string is then resolved by the authoritative domain name server just as any English domain name.

38 Claims, 2 Drawing Sheets

METHOD AND SYSTEM FOR INTERNATIONALIZING DOMAIN NAMES

This application claims the benefit of U.S. Provisional Application Ser. No. 60/124,956 filed Mar. 18, 1999.

BACKGROUND OF THE INVENTION

The present invention relates to the internet arts. It finds particular application to a method and system for internationalizing internet domain names such that a non-compliant international domain name can be processed by the existing internet structure.

With the proliferation and extremely fast adoption of the Internet around the globe, the need for international capabilities on the Net has become a matter of absolute necessity. A lot of work has been done so far on the subject of localization of scripts and the internationalization (I18N) of systems. However, up to this date, the Internet has remained more associated and very tightly dependent upon the English language since the current Domain Name System (DNS) is presently restricted to the monocase 7 bit ASCII English language alphabet.

The Domain Name System is the part of the Internet infrastructure that translates human-readable domain names into the Internet Protocol (IP) numbers needed to establish TCP/IP communication over the Internet. So far, existing domain name server systems accept only domain names according to RFC1035. RFC1035 specifies the alphabet (set of allowed symbols), the syntax and all restrictions for permissible/valid domain names. Currently, only A to Z upper case, a to z lower case, the "–" and "." are permitted.

There have been proposals which suggest changing the domain name server system to accommodate I18N. While the proposed solution could work, it requires major changes to the Internet as it exists today. Domain name servers around the globe, which number in the thousands, would have to be changed or updated. In the meantime, existing domain name servers would not be able to handle the new queries sent to them by I18N-enabled domain name servers. Results of these I18N queries can vary anywhere from single rejection to a complete crash of the non-enabled domain name servers.

The present invention provides a solution to this problem in that the present invention would allow users of the Internet to use international domain names mainly in their own script or characters. The present invention works with the existing domain name servers around the world and does not require any updates to be applied to these servers nor any changes to be made to their configurations.

The present invention provides a new and unique method and system for internationalizing domain names which cures the above problems and others.

SUMMARY OF THE INVENTION

In accordance with the present invention, a method of converting an internet international domain name to an RFC1035 compliant format is provided. The international domain name includes non-English characters which are RFC1035 non-compliant. The international domain name is intercepted and transformed to an RFC1035 compliant domain name. A redirector string is generated which includes information for resolving the RFC1035 compliant domain name. The redirector string is then appended to the RFC1035 compliant domain name.

In accordance with a more limited aspect of the present invention, the intercepting is transparent to the user and occurs on a user's computer.

In accordance with a more limited aspect of the present invention, the international domain name is converted to a UNICODE string which includes a 16-bit format The 16-bit format is then transformed to a 5-bit format which is RFC1035 compliant.

In accordance with another aspect of the present invention, in a system for accessing the Internet from an user computer by obtaining a domain name where a domain name server requires the domain name to be in a first format, a method for requesting an international domain name which is in a second format is provided. The international domain name is obtained and transformed from the second format to the first format which is acceptable by the domain name server. The transformed international domain name is then transmitted to the domain name server. The domain name server resolves the transformed name to obtain an IP number corresponding to the international domain name. The user can then access the internet using the IP number.

In accordance with a more limited aspect of the present invention, the international domain name is transparently intercepted on the user computer and analyzed to determine the second format.

In accordance with another aspect of the present invention, a system for requesting international domain names with a user machine in communication with the Internet is provided. A domain name server is connected to the Internet which resolves a domain name request by retrieving an IP number corresponding to the domain name. The domain name server requires the domain name to be in a first character format. An Internet program provides communication between the user machine and the Internet. The internet program allows the user to request communication to an internet location by obtaining a domain name of the internet location which is an international domain name having a second character format that is different than the first character format. A domain name transformer transforms the international domain name to a compliant domain name which has the first character format. The domain name transformer is installed on the user machine. The transformation is performed transparent to both the user and the domain name server. A resolver receives and resolves the compliant domain name from the domain name transformer into an IP number of the internet location by transmitting the compliant domain name to the domain name server which returns an IP number of the internet location corresponding to the compliant domain name and thus allows communication with the internet location.

In accordance with a more limited aspect of the present invention, the domain name transformer appends a redirector string to the compliant domain name which provides delegation instructions for resolving the complaint domain name.

One advantage of the present invention is that domain name transformer is provided at the user level which allows any character to be used in a domain name. The transformation is performed transparent to the user and transparent to the current Internet protocols.

Another advantage of the present invention is that international domain names are converted to RFC1035 compliant format such that current domain name servers do not have to be modified in order to accept international domain names inputted by an user. The invention allows the use of international domain names with the existing Internet infrastructure and does not require its modification.

Another advantage of the present invention is that it works on the user's machine and is totally transparent to all standard, compliant software programs. Not only will the browser, e-mail, ftp, telnet, gopher, news and other common internet programs function with the present invention, but all compliant Internet programs will work transparently with the present invention.

Another advantage of the present invention is that transformation of a domain name and generation of the redirector information is performed on an user's computer prior to being received by a domain name server. In this manner, the domain name server is unaware that domain name requests are being processed by an international root server.

Another advantage of the present invention is that the domain name transformation allows for a reverse look-up transformation such that an IP number can be reverse transformed to obtain its corresponding international domain name.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be imitative of the scope of the present invention, wherein.

DETAILED DESCRIPTION OF THE PREFERRED EMBODIMENTS

Figure 1:
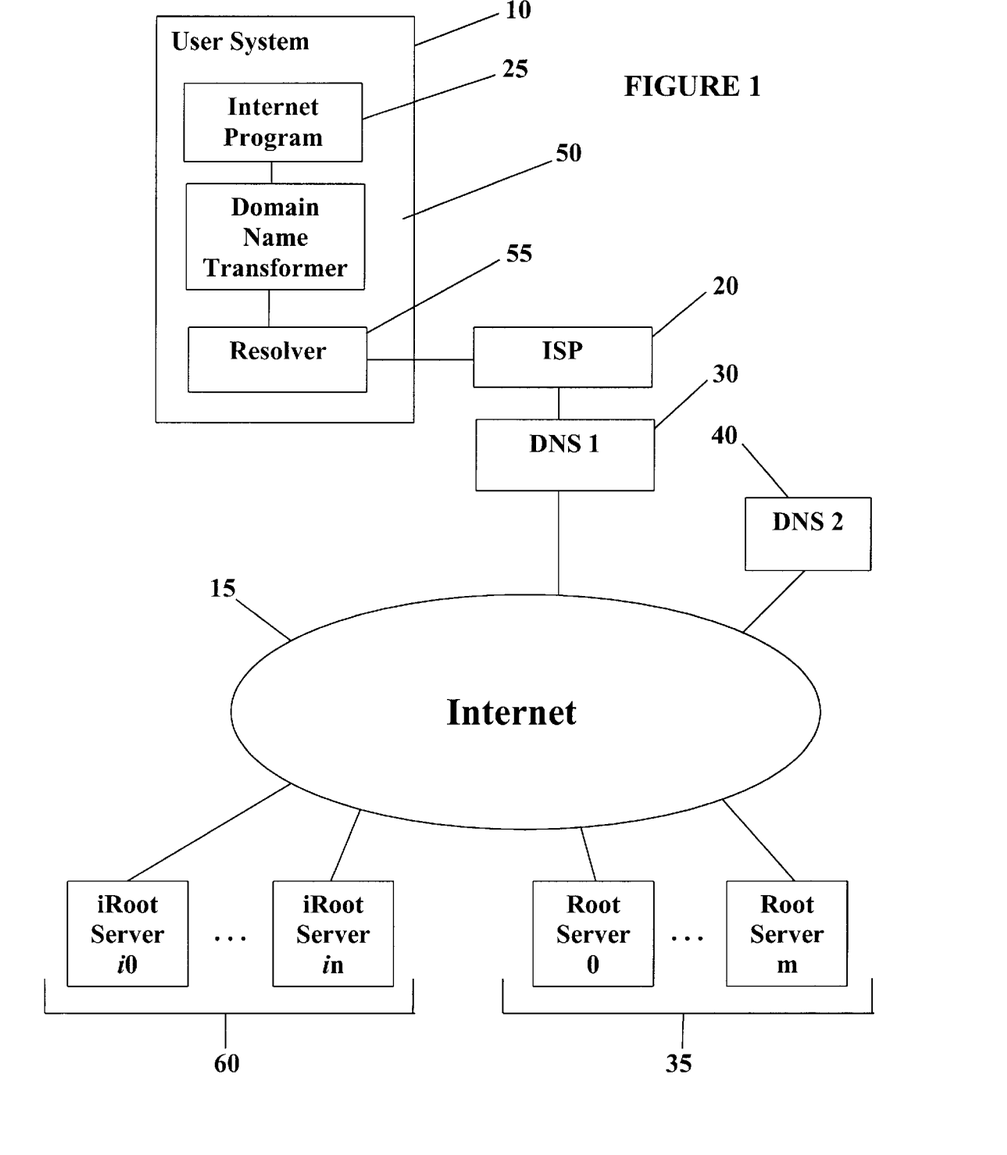
FIG. 1 illustrates an Internet and user configuration in accordance with the present invention.

With reference to FIG. 1, a user system 10 is typically connected to the Internet 15 through an Internet service provider (ISP) 20. The following description works with any Internet compliant programs such as a browser, email, ftp, telnet, gopher, news, and others as is know in the art. A browser is used here for exemplary purposes. An Internet program 25, such as a browser, runs on the user's computer and provides an interface between the user 10 and the Internet 15. The browser 25 helps the user maneuver through sites on the Internet 15 and communicate information between the user 10 and the sites. The user establishes a connection to a site by requesting a domain name of the site into the browser 25. The browser 25 initiates resolution of the domain name which ultimately results in obtaining an Internet protocol number (hereinafter "IP number") that is an Internet address of the website or other Internet location identifier corresponding to the domain name as is known in the art.

A domain name server (DNS1) 30 is connected to the internet service provider 20 and processes domain name requests to retrieve a corresponding IP number. Currently, there are about 300,000 domain name servers throughout the world each being responsible for the domain names of a group of domains which were registered to that domain name server. Each domain name server includes a database containing registered domain names, their corresponding IP number/address, and other domain related information. If the domain name requested is unknown to the domain name server 30, it will consult a root server selected from a group of root servers 35. Currently, there are about 13 main root servers throughout the world.

Each root server 35 handles a pre-determined set of domain names based on its top level domain. For example, there are a few root servers responsible for handling all domain names with ".com" as their top level domain. Another set of root servers is responsible for all domain names having ".org" as its top level domain and so on. For each domain name registered within a root server, the root server identifies which domain name server (or another root server) is responsible for the domain name. Current root servers are configured to store a primary domain name server address and up to four back-up domain name servers which are responsible for resolving the domain name requested. The processing is then transmitted by DNS1 30 to the appropriate domain name server, for example, domain name server (DNS2) 40 which returns an IP number for the domain name requested. This resolution process many involve more intermediate DNS servers along the way but will always function in a similar manner to what was explained here. The user may then connect to the site corresponding to that IP number. Of course, once the IP number is known, any Internet connection (e.g. Telnet, ftp, etc.) can be made.

As mentioned in the background section, current domain name servers are limited to receiving domain names which are RFC1035 compliant. In other words, domain names must be in the English alphabet. The present system cures this short coming by allowing a user 10 to request a domain name that includes non-English characters (which is hereinafter called an "international domain name"). In order to avoid modifying the domain name servers to handle such a request, the international domain name is converted by the present system to an RFC1035 compliant domain name before it is received by the domain name server.

With further reference to FIG. 1, a domain name transformer 50 is installed in the user's system 10 and includes a software layer that is inserted inside the TCP/IP stack on the computer system. This layer is positioned to intercept all domain resolution calls on the user's system prior to reaching the resolver 55. In a Windows based system, if Winsock 1.x (a Windows socket layer) is operating on the user's system, the winsock.dll is shifted in the processing sequence by a new winsock.dll. The new winsock.dll is positioned before the original winsock.dll so that domain name function calls, such as GetXbyY, are intercepted. The new winsock.dll then transforms the international domain names as described below. After the transformation, the new winsock.dll passes the processing to the original winsock.dll with the transformed domain name. Other function calls directed to Winsock that are not related to domain name functions pass-through the new winsock.dll to the original winsock.dll. Another version of Winsock, Winsock 2, includes Layered Service Provider (LSP) and Name Space Provider (NSP) which are both layers. The NSP provides the GetXbyY function so that queries that have to resolve a domain name are performed by this component. In the case of Winsock 2, the present system installs a new version of the NSP which is a domain name server NSP replacing the original NSP or adds an additional NSP layer to function with the original NSP. When the new NSP receives a domain name, it applies the transformation logic of the present invention to transform an international domain name to a compliant format, and then calls the original resolver function 55 (e.g. GetXbyY, WSAGetXbyY) with the transformed name. Regardless of the user's original software, it will be appreciated that the present invention can be installed at any desired position in the processing sequence on the user's machine such that an international domain name is intercepted/obtained, and transformed before it reaches a domain name server (e.g. between the origination of the domain name and the resolving of the domain name).

With the present transformation software in place, when the user requests an international domain name, the domain name transformer 50 intercepts the request and converts the international domain name to an RFC1035 compliant format. The transformation is performed transparent to the user and to the other components of the system so that additional modifications to the system are not required. Once the international domain name is transformed to a proper format, it is then passed to the resolver 55 which completes the domain resolution call function. The resolver 55 communicates to the domain name server 30 where the domain name is resolved as usual. Thus, the current domain name servers are unaware of the transformation and do not have to be modified in order to process an international domain name. The present invention, using redirector information, allows an existing domain name server to resolve an international domain name in the same manner as domain names are currently resolved.

Figure 2:
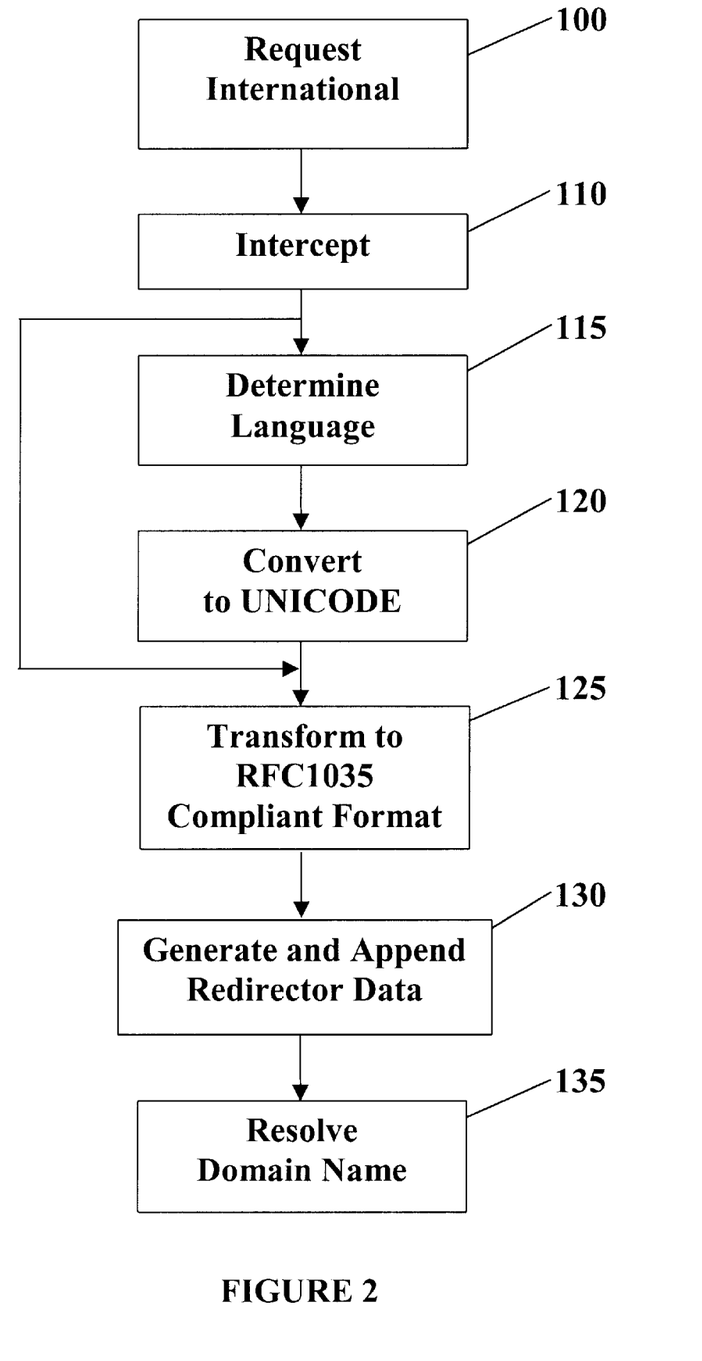
FIG. 2 illustrates the domain name transformation process in accordance with the present invention.

With reference to FIG. 2, the transformation process is shown. When an international domain name is requested 100, the domain name is intercepted 110 before it reaches the system's domain name resolver 55. In other words, the domain name is obtained by the present system whether it is entered by the user, activated from a hyperlink, or obtained in any other manner as is known in the art. The domain name is traversed to determine if any character exists which is not RFC1035 compliant. If any such character exists, then the domain name is considered to be an international domain name. Depending on the user's version of software, UNICODE is either supported or not. If UNICODE is not supported, the present system performs the additional steps of determining the language 115 of the international domain name and then converting 120 the international domain name to its corresponding UNICODE string. The language of the domain name is determined from the active code page ID from the user's system. The code page ID identifies what language the domain name is in and, thus, identifies its character set. By knowing the character set, the international domain name is converted to its UNICODE string as is known in the art. If, however, the user's system supports UNICODE, these previous two steps are skipped because the domain name will already be put in UNIC6DE format by the system. The UNICODE string is then transformed 125 to an RFC1035 compliant format which is described as follows.

The current domain name protocol RFC1035 includes only 37 characters. Using binary format, at least 5-bits are required to represent 37 values. UNICODE, however, is a 16-bit format. Thus, in the preferred embodiment, the 16-bit format of the UNICODE string is transformed to a 5-bit format that is RFC1035 compliant. This transformation, called UTF-5, is described in the memorandum "Internationalization Of Domain Names," by H. Duerst, July 1998 which is incorporated herein by reference.

Several encodings for the Universal Character Set (UCS), so called UCS Transform Formats (UTF), exist already, namely UTF-8 [RFC2044], UTF-7 [RFC1642], and UTF-16 [UNICODE]. Unfortunately, none of them is suitable for the present transformation from 16-bits to 5-bits. Therefore, UTF-5 is defined to perform this encoding using the following principles:

To accommodate the slanted probability distribution of characters in UCS4 (Universal Character Set four bytes long), a variable-length encoding is used.

Each target letter encodes 5 bits of information. Four bits of information encode character data, the fifth bit is used to indicate continuation of the variable-length encoding.

Continuation is indicated by distinguishing the initial letter from the subsequent letter.

Leading four-bit groups of binary value 0000 of UCS4 characters are discarded, except for the last two groups (i.e. the last octet). This means that looking at the UNICODE layout map of languages, ASCII and Latin-1 characters need two target letters, the main alphabets up to and including Tibetan need three target letters, the rest of the characters in the BMP need four target letters, all except the last (private) plane in the UTF-16/Surrogates area [UNICODE] need five target letters, and so on.

The letters representing the various bit groups in the various positions are chosen according to the following table:

| Nibble Value | | |
| --- | --- | --- |
| Hex | Binary | Initial |
| 0 | 0000 G | 0 |
| 1 | 0001 H | 1 |
| 2 | 0010 I | 2 |
| 3 | 0011 J | 3 |
| 4 | 0100 K | 4 |
| 5 | 0101 L | 5 |
| 6 | 0110 M | 6 |
| 7 | 0111 N | 7 |
| 8 | 1000 O | 8 |
| 9 | 1001 P | 9 |
| A | 1010 Q | A |
| B | 1011 R | B |
| C | 1100 S | C |
| D | 1110 T | D |
| E | 1110 U | E |
| F | 1111 V | F |

As an example, suppose a current domain is "is.s.u-tokyo.ac jp" with the components standing for information science (is), science (s), the University of Tokyo (u-tokyo), academic (ac), and Japan (jp). This might be represented by "JOUHOU.RI.TOUDAI.GAKU.NIHON" (a transliteration of the kanji that might probably be chosen to represent the same domain). Writing each character in U+HHHH notation as in UNICODE (represented by a "U+" and four hexidecimal digits HHHH), this results in the following:

U+60c5U+5831.U+7406.U+6771U+5927.U+5b66.U+65e5U+672c

This UNICODE string is given for reference only. It is not the actual encoding or something being typed in by the user. The UNICODE string is then transformed to RFC1035 compliant format according to UTF-5 before submitting it to the domain name server resolver. The UNICODE string becomes:

M0C5L831.N406.M771L927.LB66.M5E5M72C

Using the above table, it is seen that the HHHH component "60c5"is transformed to "M0C5" since "6" is encoded to "M." The "5831" becomes "L831" and so on.

Of course, the transformations of the present invention are dependent on the current protocols and standards. Thus, if the protocols are changed such that different character sets are used, the transformation would change to adopt the new protocols. It will be appreciated that if RFC1035 is no longer the complaint standard for domain names, the present invention can be easily modified such that the transformation converts the international domain names to the new domain name standard format.

The following is an another example that illustrates the present translation process:

| | |
|---|---|
| The following is an another example that illustrates the present translation process: | |
| صفحةوليد | Domain name as it appears on the screen as typed by user in Arabic. |
| d5 dd cd c9 dc e6 el ed cf | Corresponding system character code representation Code Page ID as returned by system is charset1256 (Arabic). The corresponding UNICODE Range 0x0600–0x06ff |
| 0635 0641 062d 0629 0640 0648 0644 064a 062f | Translation of character codes into the corresponding UNICODE codes |
| M35M41M2dM29M40M48M44M4aM2f | Apply the restricted mapping from UNICODE to a RFC1035 compliant name (using the UDM - United Data Mapper) |
| ar.il8n.net | Use UDM to determine the redirector information including an iroot server set based on the UNICODE range; Select the candidate iroot server from the returned set |
| M35M41M2dM29M40M48M44M4aM2f.ar.il8n.net | Construct the final domain name by appending the redirectorinformationtotheFC1035 compliant domain name obtained above Pass the final domain name to the TCP/IP layer below to perform name resolution per the normal operation. |

With further reference to FIG. 2, after the above transformation, the international domain name is in RFC1035 compliant format. The string "ar.il8n.net" is redirector information 130 that is appended to the converted string and functions like a top level domain, and identifies the authoritative domain name server responsible for the current domain name. Once the redirector information is appended to the domain name, the domain name becomes a fully qualified domain name (FQDN). A fully qualified domain name includes at least a top level domain and a secondary domain which is enough information to resolve the domain name. As explained previously, the domain name server 30 resolves a domain name by inquiring the root server 35 (the root server responsible for the top level domain found in the domain name) about which domain name servers are authoritative domain name servers for the given domain name. The responsibility of top level domains such as, ".com", ".net", ".org", ".edu", etc., is assigned to a pre-selected set of root servers. Thus, the inquiry for a domain name such as "abc.net" would be directed to one of the root servers in the root server set responsible for ".net" domains.

The above redirector information "ar.il8n.net" provides the following exemplary delegation instructions for resolving the international domain name. Of course, any identifiers can be used to represent a domain set. The "i18n" identifies the domain name as "international" and the "ar" further identifies it as being in Arabic which is determined from the UNICODE range of the domain name characters. The domain resolution is explained as follows. The transformed compliant domain name including the redirector information is received by the domain name server 30 where it is attempted to be resolved. The domain name server 30 identifies the top level domain ".net" for which it is not an authoritative DNS. As such, the domain name server consults an authoritative root server which is responsible for net domains, for example, root server m from the root server group 35. Examining the second level domain "i18n", root server m determines from its database that the authoritative domain name server for this domain is, for example, DNS2 40. DNS1 30 then communicates the entire domain to DNS2 40. DNS2 40 first determines whether it is authoritative and delegated for this domain by scanning its database of registered domains. In this case, DNS2 40 determines from the redirector information that the delegated server for "ar.il8n.net" (Arabic domains) is the iroot server i3 from iroot server group 60. The resolution continues in the predescribed manner until the authoritative DNS for the current domain is determined which returns the IP number of the domain name. The foregoing example assumes that the domain "i18n.net" and sub-domain "ar.i18.net" were properly pre-assigned and registered to the appropriate root servers and domain name servers.

In the preferred embodiment, the redirector information controls the delegation path for resolving the domain name. The redirector information can be a single unique top level domain which identifies an international root server (iroot server) or may include multiple levels of identifiers such as "ar.i8n.net". As shown in FIG. 1, a group of iroot servers 60 are connected to the Internet. For exemplary purposes, the iroot servers are identified as i0, i1 . . . in. Of course, any type of identifiers can be used to name the root servers. Each iroot server 60 is configured to function in the same manner as any other root server 35 which handle English domain names.

Another example of using the redirector information would include appending ".i3" to the converted domain name string. To generate the redirector information, the system determines which iroot server is responsible for the domain name. For this purpose, the UNICODE string is examined using a Unified Domain Mapper (UDM). The character values of the UNICODE string will belong to a specific character range. The character range in turn identifies the character set/language of the international domain name (e.g. Arabic, Japanese, etc.) Thus, if it is determined that the international domain name was entered in Arabic, the system selects the iroot server which is responsible for Arabic domain names (e.g. "i3") and ".i3" becomes the top level domain. The domain name server 30 then knows to direct the domain name request to the proper iroot server to query for the user's specified domain/host based on the redirector information, in this case, iroot server i3. Alternately, the redirector information may be generated from a predetermined string that covers all or a sub-set of the international domains. For example, ".i" can represent all international domains, ".ap" can represent a sub-set "Asia pacific", ".ar" can represent a sub-set "Arabic" or any other predetermined identifiers. This predetermined redirector can be appended to the transformed domain name by the software. Of course, any predetermined string can be used to identify an international domain and identify a responsible server. Alternately, the user or internet program can supply the redirector information along with the domain name, thus generating the redirector information. In this way, the user or program adds a ".i" to a domain name which identifies it as international.

With further reference to FIG. 2, after the transformation, the RFC1035 compliant domain name includes the transformed domain name and the appended redirector information which makes it a fully qualified domain name. The compliant domain name is sent to the resolver where it is resolved 135 according to the resolver functions as described above. The resolver function communicates with the domain name server 30 and the process continues until the proper IP number corresponding to the original domain name is returned.

With the present invention, the international domain name transformation allows for the reverse look-up of domain names from their corresponding IP number. Each domain name server contains a data base of registered domain names and their corresponding IP number. Given an IP number, the domain name can be retrieved. This name, of course, is an RFC1035 compliant name which can be converted back to a UNICODE formatted string. The UNICODE string can then be translated back to its original character set in the original international language.

The present system also provides for dynamic modification of its software. When root servers are re-assigned or new root servers added, the redirector information must reflect these changes so that international domain names are properly resolved. The present system includes a periodic look-up function which periodically looks to root servers or other predefined locations on the internet to determine if changes have been made. If changes are made, modified software (such as a new UDM mapper) is provided automatically to the user system. In this manner, the present invention modifies and updates itself.

The present invention is transparent to the existing infrastructure of the Internet and is totally hidden in operation from both ends of the communication path, namely, the user 10 and the domain name server 30. With the present invention, users are not required to add or change any configuration information on their computer systems. Users can keep the same Internet Service Provider 20, the same computer system and the same network configuration. All that is required is to install the present system in the user's computer system 10 as described above. Once the present system is installed, the user can start using international domain names immediately. The Internet Service Provider (ISP) and the Domain Name Servers (DNS) do not have to change their present configurations.

The invention has been described with reference to the preferred embodiment. Obviously, modifications and alterations to others upon a reading and understanding of this specification. It is intended to include all such modifications and alterations insofar as they come within the scope of the appended claims are the equivalence thereof.

I claim:

1. A method of converting an internet international domain name to an RFC1035 compliant format, where the international domain name includes non-English characters which are RFC1035 non-compliant, the method comprising:

intercepting the international domain name, where the intercepting is transparent to the user;

transforming the international domain name to an RFC1035 compliant domain name;

automatically generating a redirector string which includes information for resolving the RFC1035 compliant domain name; and appending the redirector string to the RFC1035 compliant domain name.

2. The method of converting as set forth in claim 1 further including obtaining the international domain name on a user system and, the intercepting occuring at a network layer in the user system.

3. The method of converting as set forth in claim 2 wherein the intercepting occurs in a Windows socket layer where, if the Windows socket layer is Winsock 1.1, the converting includes shifting the Windows socket layer and adding a new winsock layer which performs the intercepting and transforming.

4. The method of converting as set forth in claim 3 wherein if the Windows socket layer includes a name space provider, the converting includes replacing the name space provider with another name space provider which performs the intercepting and transforming.

5. The method of converting as set forth in claim 3 wherein if the Windows socket layer includes a name space provider, the converting includes adding a new name space provider layer which performs the intercepting and transforming.

6. The method of converting as set forth in claim 1 further including, after the intercepting, converting the international domain name to a UNICODE string if the international domain name is not in a UNICODE format, and wherein the transforming includes transforming the UNICODE string to the RFC1035 compliant domain name.

7. The method of converting as set forth in claim 6 wherein the UNICODE string is a sixteen bit string and the transforming includes transforming the sixteen bit UNICODE string to a five bit string, the five bit string being in an RFC1035 compliant format.

8. The method of converting as set forth in claim 1 wherein the automatically generating of the redirector string being based on the international domain name.

9. The method of converting as set forth in claim 1 wherein the redirector string includes a plurality of domain levels.

10. The method of converting as set forth in claim 1 wherein the redirector string is automatically generated from a predetermined string.

11. In a system for accessing the internet from a user computer by obtaining a domain name where a domain name server requires the domain name to be in a first format, a method of accessing the internet with an international domain name comprising the steps of:

obtaining the international domain name being in a second format;

transforming the international domain name from the second format to the first format which is acceptable by the domain name server;

automatically generating a redirector string based on the international domain name and appending the redirector string to the transformed international domain name, transmitting the transformed international domain name to the domain name server;

resolving the transformed international domain name by the domain name server to obtain an IP number corresponding to the international domain name; and accessing the internet by the user computer using the IP number.

12. The method of accessing the internet as set forth in claim 11 further including, after the obtaining:

transparently intercepting the international domain name on the user computer, and;

analyzing the international domain name to determine the second format.

13. The method of accessing the internet as set forth in claim 12 further including converting the second format into UNICODE before transforming into the first format.

14. The method of accessing the internet as set forth in claim 13 wherein the first format is an RFC1035 compliant format and the second format is an RFC1035 non-compliant format.

15. The method of accessing the internet as set forth in claim 11 wherein the redirector string identifying an authoritative server which is responsible for the international domain name such that the domain name server communicates with the authoritative server to obtain the IP number.

16. The method of accessing the internet as set forth in claim 15 wherein the redirector string includes a plurality of domain levels.

17. The method of accessing the internet as set forth in claim 15 wherein the redirector string is generated from a predetermined identifier.

18. The method of accessing the internet as set forth in claim 12 wherein the intercepting is performed in a Windows socket layer.

19. The method of accessing the internet as set forth in claim 18 wherein if the Windows socket layer is Winsock 1.1, the method further includes adding an additional winsock layer which performs the intercepting and transforming before the Windows socket layer.

20. The method of accessing the internet as set forth in claim 18 wherein if the Windows socket layer includes a name space provider, the converting includes replacing the name space provider with a new name space provider which performs the intercepting and transforming.

21. The method of accessing the internet as set forth in claim 18 wherein if the Windows socket layer includes a name space provider, the converting includes adding a new name space provider layer which performs the intercepting and transforming.

22. A system for requesting international domain names with a user machine in communication with an internet where the internet includes a domain name server which resolves a domain name request by retrieving an IP number corresponding to the domain name, the domain name server requiring the domain name to be in a first character format, the system comprising:

an internet program for providing communication between the user machine and the internet, the internet program allowing a user to request communication to an internet location by obtaining a domain name of the internet location, the domain name being an international domain name having a second character format different than the first character format;

a domain name transformer for transforming the international domain name to a compliant domain name having the first character format, the domain name transformer automatically generating a redirector string based on the international domain name and appending the redirector string to the compliant domain name, the domain name transformer being installed on the user machine, the transforming being performed transparent to both the user and the domain name server; and a resolver for receiving and resolving the compliant domain name from the domain name transformer into an IP number of the internet location, the resolver transmitting the compliant domain name to a domain name server, the domain name server returning the IP number of the internet location corresponding to the international domain name to allow communication between the user machine and the internet location.

23. The system as set forth in claim 22 wherein the domain name transformer converts the international domain name to a UNICODE string if the international domain name includes a non-UNICODE format, and the UNICODE string being transformed to the first character format.

24. The system as set forth in claim 22 further including an international root server which communicates with the domain name server, the international root server identifying a location of a domain name server responsible for the international domain name and maintains a corresponding IP number.

25. The system as set forth in claim 23 wherein the domain name transformer generates the redirector string based on the UNICODE string.

26. The system as set forth in claim 23 wherein the domain name transformer generates the redirector string based on a predetermined string.

27. The system as set forth in claim 22 wherein the domain name transformer includes a redirector generator for generating the redirector string including at least one domain level, the redirector string being appended to the compliant domain name for providing delegation instructions for resolving the complaint domain name.

28. A software program for enabling a user device to be connected to the Internet wherein domain name requests in the user device are obtained having a non-compliant format; said program comprising:

instructions for modifying a domain name resolving process in the user device; wherein said instructions for modifying include instructions for performing the following steps:

transforming a non-compliant domain name request to a compliant format;

automatically generating a redirector string which includes information for resolving the domain name request; and appending the redirector string to the domain name request.

29. The software program of claim 28 wherein said instructions for transforming include instructions for appending a redirector string to said transformed compliant domain name to produce a fully qualified domain name.

30. The software program as set forth in claim 29 further including instructions for automatically generating the redirector string where the redirector string identifies a domain name server for resolving the transformed compliant domain name.

31. A method of modifying a user device which communicates to the Internet wherein the user device processes a compliant domain name according to a resolving procedure, and further wherein a domain name request may be in a non-compliant format, the method comprising the steps of:

providing a program to the user device for modifying the resolving procedure so that the modified resolving procedure performs the following steps:

transforming a non-compliant domain name to a compliant domain string;

automatically generating a redirector string which includes information for resolving the transformed compliant domain string; and appending the redirector string to the compliant domain string.

32. The method as set forth claim 31 wherein the generating a redirector string is performed automatically and the transforming is transparent to a user.

33. The method of claim 31 wherein said step of appending said redirector string to said compliant domain string produces a fully qualified domain name.

34. The method of claim 33 wherein said redirector string includes a plurality of domain levels.

35. The method of claim 34 wherein said redirector string is automatically generated from a predetermined identifier.

36. The method of claim 35 wherein said redirector string is automatically generated based on information in a UNICODE string.

37. The method of claim 31 wherein said transforming step comprises the step of converting a UNICODE string to said compliant domain string.

38. The method of claim 31 wherein said transforming step comprises the step of converting the non-compliant domain name to a UNICODE string.

* * * * *

UNITED STATES PATENT AND TRADEMARK OFFICE
CERTIFICATE OF CORRECTION

PATENT NO.    : 6,182,148 B1
DATED         : January 30, 2001
INVENTOR(S)   : Walid R. Tout

It is certified that error appears in the above-identified patent and that said Letters Patent are hereby corrected as shown below:

In the Drawings, in Figure 2, in the Box 100, please insert --Domain Name-- after "Request International".

In the Specification, Column 7, Line 38, please delete the underlining from "redirector information to the".

Signed and Sealed this

Twenty-ninth Day of May, 2001

Attest:

NICHOLAS P. GODICI

*Attesting Officer*        *Acting Director of the United States Patent and Trademark Office*